United States Patent
Felcman et al.

(10) Patent No.: US 6,362,955 B2
(45) Date of Patent: *Mar. 26, 2002

(54) COMPUTER SELECTIVELY CONFIGURABLE IN BOTH DESKTOP AND TOWER ORIENTATIONS

(75) Inventors: Francis A. Felcman, Rosenberg; Donald J. Hall, Houston, both of TX (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/038,643

(22) Filed: Mar. 11, 1998

(51) Int. Cl.[7] .................................................. G06F 1/16
(52) U.S. Cl. ...................... 361/683; 361/685; 312/223.1
(58) Field of Search ................................ 361/683, 684, 361/685, 707, 726, 725, 704; 312/223.1, 223.2, 223.3

(56) References Cited

U.S. PATENT DOCUMENTS

| | | | | |
|---|---|---|---|---|
| 5,450,285 A | * | 9/1995 | Sclemmer | 361/683 |
| 5,513,068 A | * | 4/1996 | Girard | 361/685 |
| 5,547,272 A | * | 8/1996 | Paterson et al. | 312/223.2 |
| 5,587,877 A | * | 12/1996 | Ryan et al. | 361/683 |
| 5,593,219 A | * | 1/1997 | Ho | 312/223.1 |
| 5,682,291 A | * | 10/1997 | Jeffries et al. | 361/683 |
| 5,748,442 A | * | 5/1998 | Toor | 361/685 |
| 5,754,396 A | * | 5/1998 | Felcman et al. | 361/683 |
| 5,768,097 A | * | 6/1998 | Jelinger | 361/683 |
| 5,808,871 A | * | 9/1998 | Rosccan et al. | 361/685 |
| 5,896,273 A | * | 4/1999 | Varghese et al. | 361/683 |
| 6,015,195 A | * | 1/2000 | Anderson et al. | 312/223.2 |
| 6,064,568 A | * | 5/2000 | Schmitt | 361/685 |
| 6,069,789 A | * | 5/2000 | Jung | 361/685 |

* cited by examiner

*Primary Examiner*—Leo P. Picard
*Assistant Examiner*—Lisa Lea-Edmonds
(74) *Attorney, Agent, or Firm*—Fletcher, Yoder & Van Someren

(57) ABSTRACT

A computer may be easily user re-configured between desktop and tower housing orientations, with the computer's front side drive units being horizontally disposed in each orientation, using specially designed drive unit support and a reconfigurable front bezel. A square opening is formed in the front exterior wall of the housing, and the support apparatus includes spaced apart channel structures extending inwardly into the housing from the four sides of the wall opening, with opposing pairs of the channel structures being adapted to slidably receive corresponding projections on opposite side edge portions of the drive units. In this manner, each front side drive unit can be supported at the opening in a first orientation in which the drive unit will be horizontally oriented with the computer in a desktop orientation, or a second orientation in which the drive unit will be horizontally oriented with the computer in a tower orientation. When the bezel is secured to the outer side of the front housing wall an opening in the bezel body outwardly overlies the housing wall opening. A frame portion of the bezel is provided with a snap-in blank off plate to cover a portion of the housing wall opening unoccupied by drive units, and the frame portion may be removably installed on the bezel body in mutually perpendicular orientations to accommodate the selected desktop or tower configuration of the computer housing.

28 Claims, 4 Drawing Sheets

COMPUTER SELECTIVELY CONFIGURABLE IN BOTH DESKTOP AND TOWER ORIENTATIONS

CROSS-REFERENCE TO RELATED APPLICATION

This application discloses subject matter similar to a portion of the subject matter illustrated in pending U.S. patent application Ser. No. 08/681,060 filed on Jul. 22, 1996 and entitled "MODULAR DESKTOP COMPUTER HAVING ENHANCED SERVICEABILITY".

BACKGROUND OF THE INVENTION

1. Field of the Invention

The present invention generally relates to computer apparatus and, in a preferred embodiment thereof, more particularly provides apparatus for supporting externally insertable drive units in a computer in a manner permitting a user to selectively configure his computer in either a desktop or tower configuration.

2. Description of Related Art

The operating components of a full size personal computer (i.e., a nonportable computer) are typically disposed within an elongated rectangular CPU housing, with the computer being sold to the consumer in either a "desktop" configuration or a "tower configuration". With the computer in its desktop configuration the housing is horizontally rested on a work surface (such as a desktop area) with the shortest side-to-side dimension of the rectangular housing extending vertically, and the front side of the computer housing facing the user. With the computer in its tower configuration the housing is supported on one of its sides in a vertical orientation on the work surface or on the floor, with the shortest dimension of the rectangular housing extending horizontally and the drive access at the top end of the computer.

The front side of the housing typically has an opening formed therein through which one or more drive units, such as a hard disk drive, a floppy disk drive and a CD ROM drive may be inserted. Each inserted drive unit is suitably supported within the housing and has a front side that extends across the front side housing opening to facilitate user access to the drive unit, and the inserted drive units are electrically coupled to associated circuitry within the housing in an appropriate manner.

For a variety of reasons it is desirable and conventional to horizontally orient the drive units relative to the user such that the rotational axes of the units are vertically oriented. In the case of a CD ROM drive such orientation is desirable to present the compact disc-supporting tray portion of the drive in a horizontal orientation to underlie and hold the disc when the tray is moved outwardly toward the user and then retracted into the CD ROM drive. While externally insertable hard disk drives may be mounted either horizontally or vertically, they are conventionally mounted horizontally as are floppy disk drives which are generally perceived to be easier to use in their conventional horizontal orientations.

Some computer purchasers prefer their computer to be in a horizontal desktop configuration, while other purchasers prefer the vertical tower configuration for their computer. Moreover, it often happens that due to subsequent changes in work space configuration or other factors a user may wish to use his desktop computer in a tower configuration or vice versa.

Heretofore, it was either difficult or simply not feasible for a user to convert his or her computer from one of these configurations to the other configuration in a manner keeping the front side drive units in the desired horizontal orientations thereof in both the desktop and tower positions of the CPU housing. To do requires rotating the drive units ninety degrees relative to the housing when the housing is switched from its horizontal desktop position to its vertical tower position or vice versa.

In the past, computer manufacturers provided purchasers with a choice between desktop and tower housing configurations—neither of which could be modified by the user to change it to the other configuration. Simply stated, if a purchaser, for example, bought a desktop computer and later wanted a tower computer he or she had to purchase a separate tower computer.

Later, some manufacturers began to use the same housing for both desktop and tower computers. This was achieved by providing a drive unit support structure that could be rotated ninety degrees relative to the housing to horizontally orient the drive units relative to the user regardless of whether the housing was to be used in a desktop or tower orientation. While it was possible for a user to convert the purchased computer from one of these orientations to the other orientation, it was quite difficult and involved purchasing a new front bezel and drive support parts for the computer and then reorienting the drive support structure within the housing and installing the new bezel in place of the original one. As might be imagined, these difficulties discouraged many computer owners from attempting to convert their computer from a desktop configuration to a tower orientation or vice verse.

In view of the foregoing it can be readily seen that a need exists for a computer which may be more easily converted by a user from either a desktop or tower configuration to the other configuration in a manner maintaining the front side drive units in a horizontal orientation in each configuration. It is to this need that the present invention is directed.

SUMMARY OF THE INVENTION

In carrying out principles of the present invention, in accordance with a preferred embodiment thereof, electronic apparatus is provided which is representatively in the form of a specially designed computer which may be reconfigured by it user between horizontal desktop and vertical tower configurations.

In a preferred embodiment thereof, the computer includes a housing having a first exterior wall with an opening therein, and a second exterior wall transverse to the first exterior wall. A modular device, representatively a drive unit, has a side and is insertable inwardly through the housing wall opening in a selectively variable one of (1) a desktop orientation in which the modular device side is parallel to the second exterior wall of the housing, and (2) a tower orientation in which the modular device side is transverse to the second exterior wall.

The computer also includes a support structure operative to support the inserted modular device in either of its desktop and tower orientations, and a specially designed reconfigurable bezel assembly which is removably securable to the outer side of the first housing exterior wall and serves to block off an area of the underlying housing opening unoccupied by an inserted modular device.

The housing opening preferably has a square configuration, and the support structure includes opposing pairs of slots extending inwardly from opposing sides of the housing opening into the interior or the housing and configured to slidably receive mounting projections on opposite side edge portions of the inserted modular device in both its desktop and tower orientations.

The bezel structure preferably includes a plate-shaped bezel body having a square opening therein and being removably securable to the outer side of the first exterior housing wall in a manner such that the bezel body opening outwardly overlies the housing opening. A square frame is removably snap-fittable into an inner side recess formed in the bezel body and extending around its opening, and an elongated rectangular plate is removably snap-fittable onto the frame in two mutually perpendicular orientations thereon.

To reconfigure the computer from, for example its desktop orientation to its tower orientation, the bezel assembly is removed from the outer side of the first exterior housing wall, and the modular device (presently in its desktop orientation relative to the computer housing) is electrically and mechanically uncoupled from the housing and pulled outwardly through the housing opening. The removed modular device is then positioned in its tower orientation relative to the housing, inserted into the housing, and then again appropriately coupled to the electrical circuitry within the housing.

To accommodate the now reoriented modular device, the removed bezel assembly is reconfigured by removing the frame from the bezel body, rotating the removed frame ninety degrees relative to the bezel body, and then snapping the reoriented frame back into the body recess to correspondingly reposition the blank-off plate relative to the bezel body so that when the bezel assembly is replaced on the housing the blank-off plate will cover the now repositioned portion of the housing wall opening unoccupied by the reoriented modular device supported therein.

After the reconfigured bezel assembly is reinstalled on the housing the housing may be rotated ninety degrees from its previous horizontal desktop orientation and placed atop a support surface in its new vertical tower orientation. The user of the computer may simply repeat the simple reconfiguration process described above to place the computer back in its previous desktop orientation.

This unique user reconfiguration of the computer selectively between desktop and tower orientations thereof is conveniently accomplished using the same computer housing, and does not require any special tools or modification of the modular device support structure within the housing. This reconfiguration method may be used with one or more modular devices, such as floppy disk drives, hard disk drives and CD ROM drives being operatively received and supported within the housing opening.

DETAILED DESCRIPTION

Figure 1A:
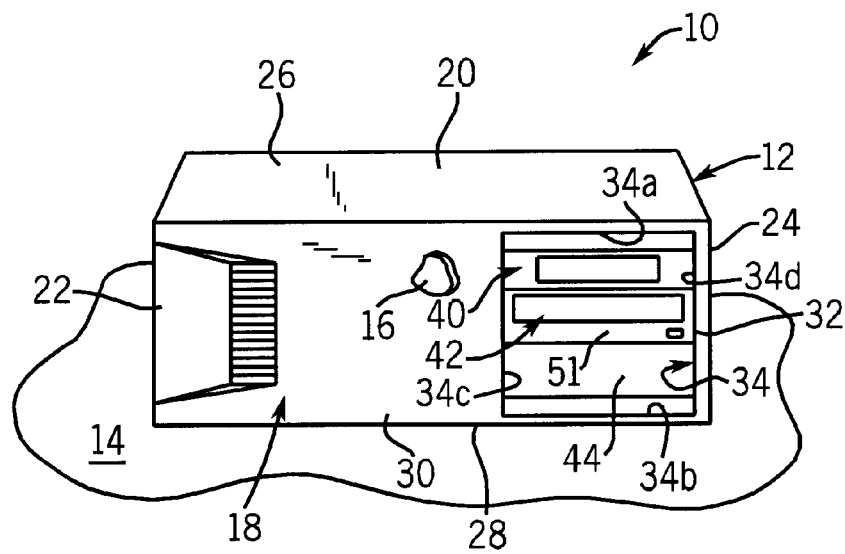
FIGS. 1A and 1B perspectively illustrate a specially designed computer which may be easily converted by a user between a horizontally orientable desktop configuration (FIG. 1A) and a vertically orientable tower configuration (FIG. 1B)
Figure 1B:
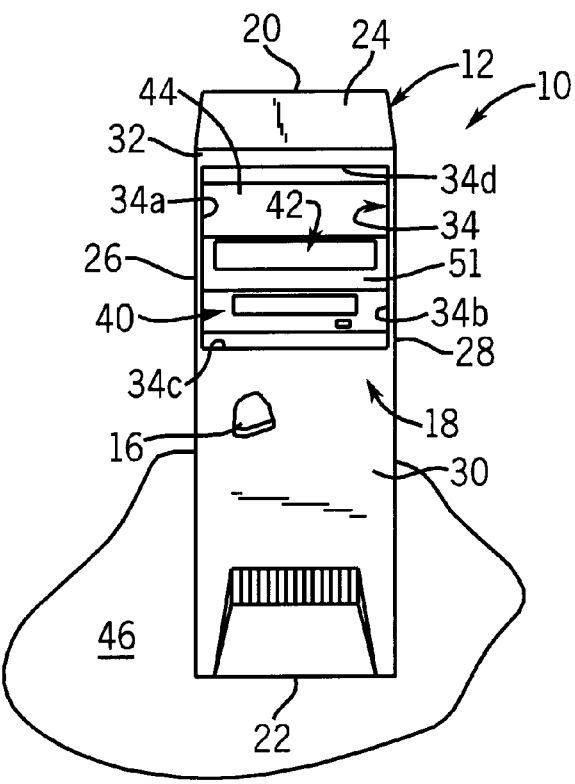

Perspectively illustrated in FIGS. 1A and 1B is a personal computer 10 embodying principles of the present invention. According to a key aspect of the invention, the computer 10 has an elongated rectangular housing 12 which may be easily converted by a user of the computer between a horizontal desktop configuration as shown in FIG. 1A, and a vertical tower configuration as shown in FIG. 1B.

Referring first to FIG. 1A, the housing 12 in its horizontal desktop configuration is shown placed atop a horizontal support surface such as a desktop 14, and has a vertically extending outer front side wall 16 covered by a subsequently described bezel assembly 18 removably secured to its outer side; a vertically extending outer rear side wall 20; opposite vertically extending outer left and rear end walls 22 and 24; and horizontally extending outer top and bottom side walls 26 and 28. As can be seen, with the housing 10 in its horizontal desktop orientation, the vertical height of the housing is less than its horizontal width and depth.

Figure 3A:
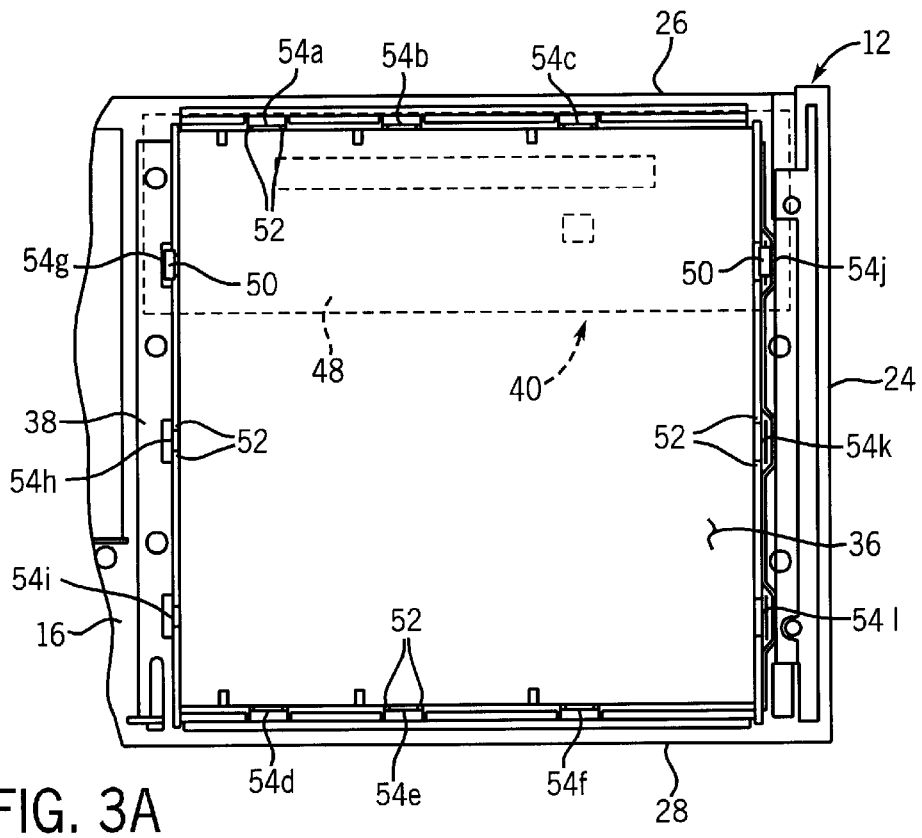
FIGS. 3A and 3B are enlarged front side elevational views of a front exterior side wall opening and associated drive support structure in the computer and respectively illustrate, in phantom, the desktop and tower mounting orientations of the installed drive unit.
Figure 4:
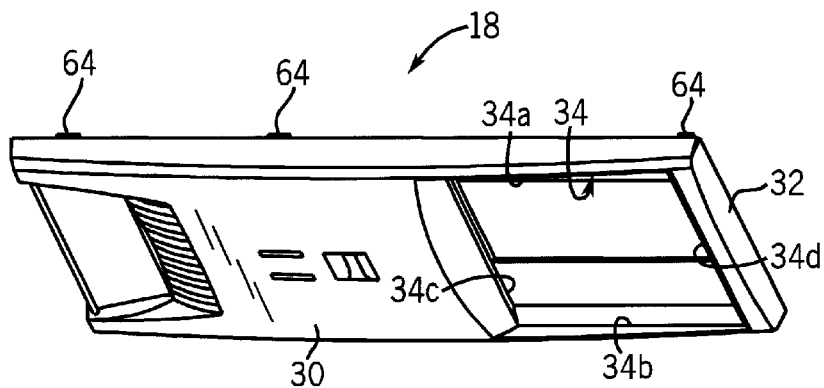
FIG. 4 is a front side perspective view of a specially designed reconfigurable bezel structure removed from the front exterior side wall of the computer housing, the bezel structure being oriented in its desktop configuration.

The bezel assembly 18 includes a horizontally elongated plastic base plate or body member 30 having, adjacent its right end 32, a square opening 34 (see also FIGS. 5A and 5B) having opposite top and bottom sides 34a,34b and opposite left and right sides 34c,34d as viewed in FIGS. 1 and 4. Bezel body member opening 34 outwardly overlies and is generally aligned with a square opening 36 (see FIGS. 2A and 3A) formed in the front housing wall 16 and bounded by housing walls 24,26,28 and a vertical interior housing wall 38 extending rearwardly from the opening 36 into the interior of the housing 12.

With the computer housing 10 in its FIG. 1A horizontal desktop configuration, modular devices, representatively a pair of drive units 40 and 42, are horizontally oriented within the housing opening 36, project into the interior of the housing 12, and are visible and operable through the bezel body opening 34. Illustratively, drive unit 40 is a floppy disk drive and extends inwardly into the housing 12 through a top portion of the housing opening 36, and the drive unit 42 is a CD ROM drive and extends inwardly into the housing 12 through a vertically intermediate portion of the housing opening 12. With both of the drive units 40,42 installed in the housing 12 a gap is left at the bottom side of the housing 12 and is configured to accept another drive unit, such as a hard disk drive to supplement at least one other hard drive (not shown) operatively mounted within the interior of the housing 12. This gap in the square housing opening 36 below the installed CD ROM drive 42 is covered, as subsequently described herein, by a horizontally elongated plastic blank-off plate member 44 of the bezel assembly 18.

As noted above, with the computer housing 12 in its FIG. 1A horizontal desktop orientation the installed drive units 40,42 are horizontally disposed relative to the user of the computer—i.e., the top and bottom sides of the drive units 40,42 are parallel to the horizontal top and bottom outer side walls 26,28 of the computer housing 12. Using specially designed features of the housing 12 and the bezel assembly 18, the present invention uniquely permits a user of the computer 10 to readily reconfigure the computer in a vertically oriented tower configuration, as shown in FIG. 1B, in which the housing may be rested on its end wall 22 atop a horizontal support surface, such as a desktop 14 or floor 46 (as shown in FIG. 1B), with the drive units 40,42 in a horizontal orientation such that the top and bottom sides of the drive units 40,42 are parallel to the now horizontal outer end walls 22,24 of the housing 12.

Turning now to FIGS. 2A–3B, the floppy disk drive unit 40 is of a generally rectangular configuration, having an elongated rectangular bezel plate 48 on its front side, and a spaced pair of outwardly projecting cylindrical mounting structures 50 (representatively the heads of a pair of mounting screws) on opposite side edge portions thereof. The CD ROM drive 42 is similarly configured and has a front side bezel plate 51 (see FIGS. 1A and 1B) and mounting screw heads (not shown) projecting outwardly from opposite outer side edges thereof.

Formed on the inner side of each of the housing walls 24,26,28 and 38 are three sets of spaced apart opposing flanges 52 which form slots 54 extending rearwardly into the interior of the housing 12 and are configured to slidingly receive the cylindrical mounting screw heads 50 on the floppy disk drive 40 and the similarly configured screw heads (not illustrated) on the CD ROM drive 42. The slots 54a–54c on the top side of the housing opening 36 respectively oppose the slots 54d–54f on the bottom side of the housing opening 36, while the slots 54g–54i on the left side of the housing opening 36 respectively oppose the slots 54j–54l on the right side of the housing opening 36.

Figure 2A:
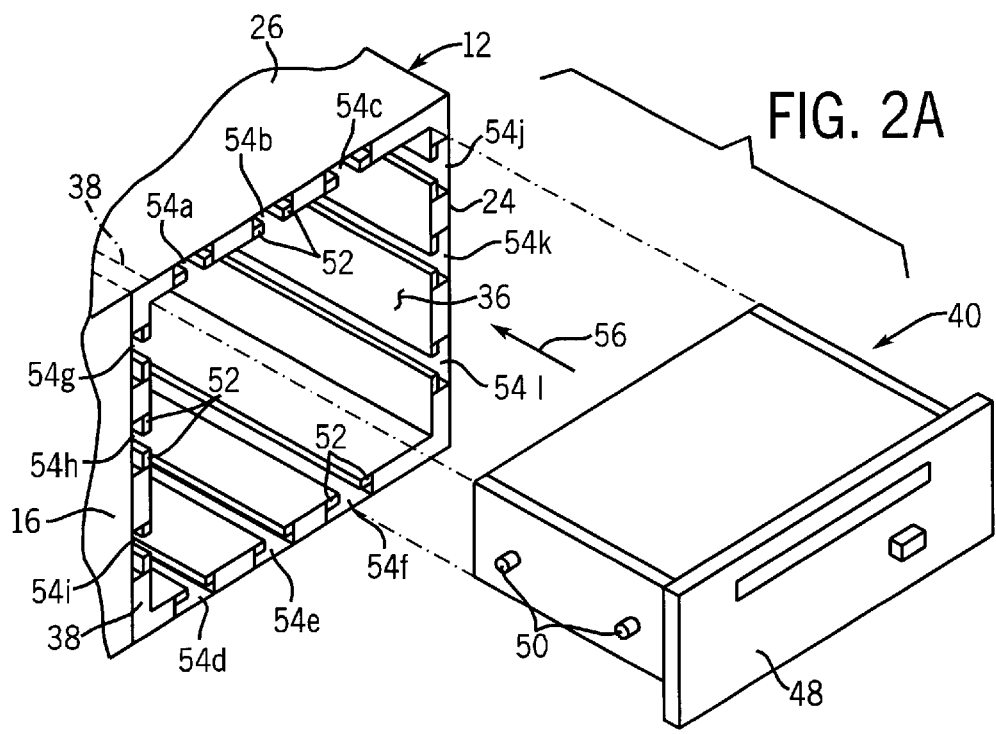
FIG. 2A and FIG. 2B are simplified perspective views of a corner portion of the computer, with its front bezel assembly removed, and respectively illustrate the installation therein of a representative drive unit in mutually perpendicular desktop and tower orientations.
Figure 2B:
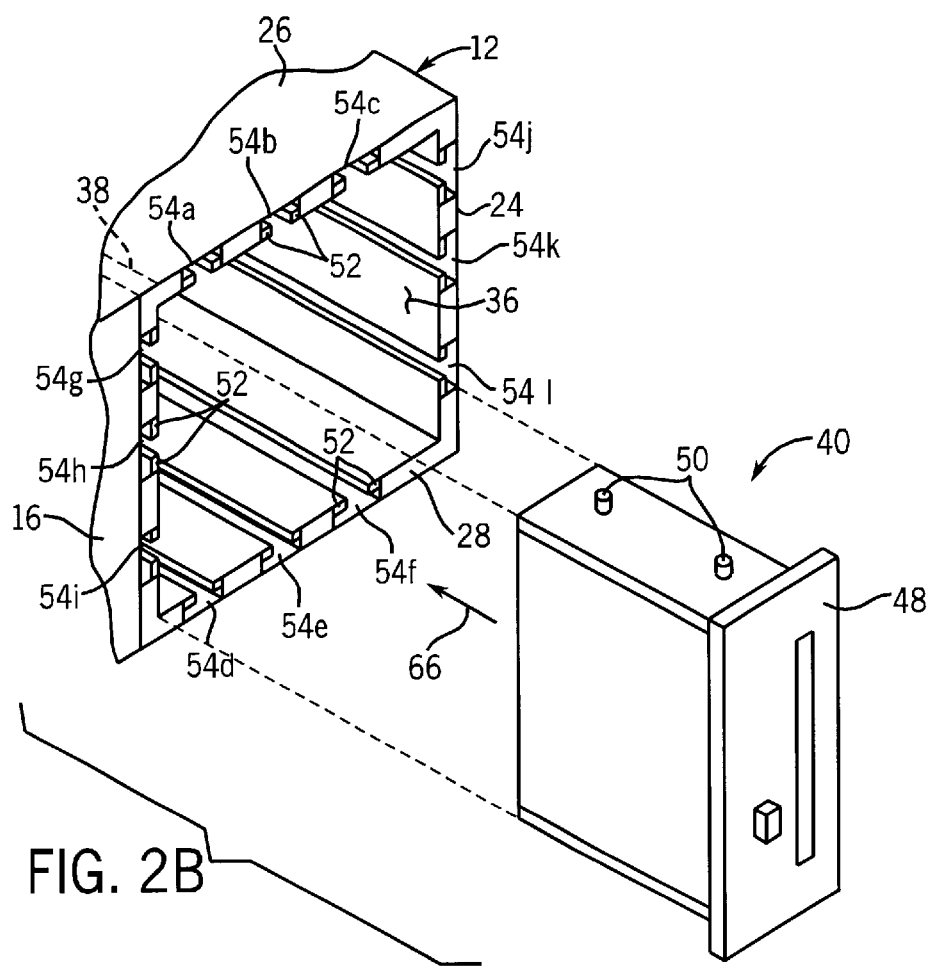

With the bezel assembly 18 removed from the outer side of the front housing side wall 16, to place the computer housing 12 in its FIG. 1A horizontal desktop configuration the floppy disk drive 40 is rearwardly inserted into the housing opening 36, as indicated by the arrow 56 in FIG. 2A in a manner causing the mounting screw heads 50 on the opposite side edges of the floppy disk drive 40 to enter the horizontally opposed flange slots 54g,54j as indicated in FIG. 3A, and positioning elongated the floppy drive front side bezel plate 48 to longitudinally extend horizontally along a top side portion of the housing opening 36 as shown in phantom in FIG. 3A. The CD ROM drive unit 42 (not shown in FIGS. 2A and 3A) is then rearwardly inserted into the housing opening in a similar manner, below the floppy disk drive 40, to cause the mounting screw heads on the CD ROM drive 42 to slidingly enter the horizontally opposed slot pair 54h,54k. The inserted drive units 40,42 may then be electrically coupled to the circuitry within the housing 12 using suitable connector cables. Drive units 40,42 are retained within the housing 12, with the drive unit front bezel plates 48,51 extending across an upper portion of the housing opening 12, by additional mounting screws or suitable latch means disposed within the housing and functioning to releasably retain the inserted drive units in place within the housing.

Figure 5A:
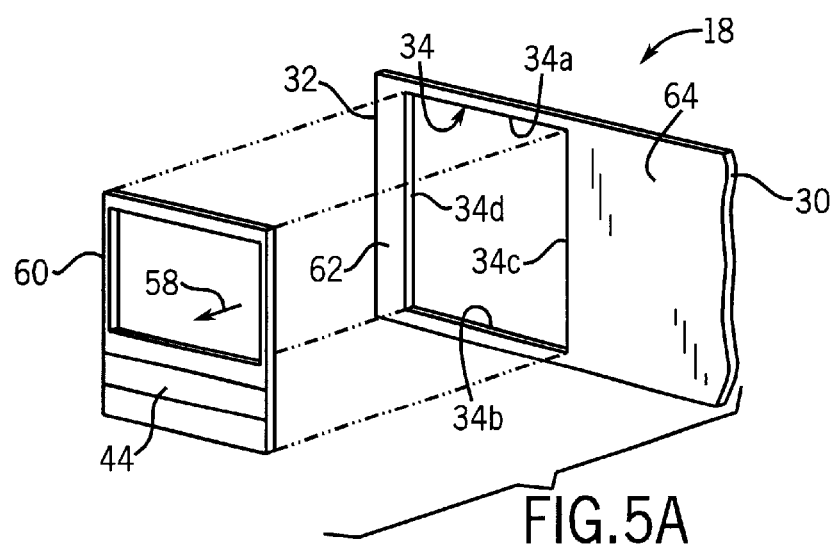
FIGS. 5A and 5B are simplified, partially exploded rear side perspective views of an end portion of the bezel structure respectively illustrating a removable frame and blank-off portion of the bezel structure in their desktop and tower orientations relative to the main body portion of the bezel structure.

With the drive units 40,42 installed in this manner, a gap is left in the housing opening 36 beneath the CD ROM drive unit 42 as previously mentioned, such gap being covered by the bezel blank-off member 44 as shown in FIG. 1A. Turning now to FIG. 5A, as indicated by the arrow 58, the blank-off member 44 is snap-fitted forwardly into a bottom side portion of a square frame member 60 which is then snap-fitted into a square well area 62 formed in the rear side 64 of the bezel body member 30 around its opening 34. With the frame 60 received in the well area 62 the blank-off member 44 longitudinally extends along the opening 34 adjacent its bottom side 34b. The bezel body 30 is then removably snap-fitted onto the outer side of the front housing wall 16, using resilient tabs 64 formed on the back side of the bezel body 30 (see FIG. 4) and snapped into corresponding slots (not shown) formed in the front housing wall 16, to place the computer 10 in its FIG. 1A horizontal desktop configuration.

Figure 3B:
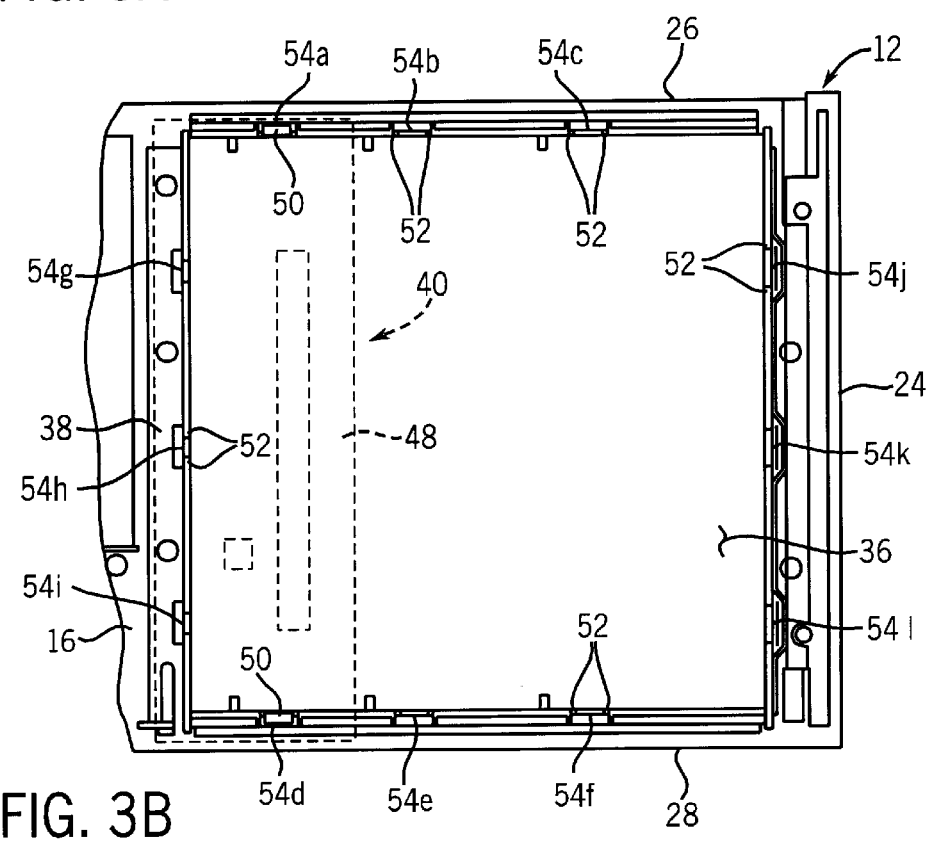

When it is desired to convert the computer 10 to its FIG. 1B vertical tower configuration, the bezel assembly 18 is removed from the front housing side wall 16, and the inserted drive units 40,42 are mechanically and electrically uncoupled from the housing 12 and pulled forwardly out of the housing opening 36. Drive unit 40 is then rotated from its FIG. 2A horizontal orientation to its FIG. 2B vertical orientation and reinserted into the housing opening 36, as indicated by the arrow 66 in FIG. 2B, to cause the upper and lower mounting screw heads 50 to be slidingly received in the opposing top and bottom side slots 54a,54d as shown in FIG. 3B. A similar rotation and reinsertion of the drive unit 42 is carried out in a manner such that its mounting screw heads are received in the top and bottom side slots 54b,54e. After such reinsertion of the reoriented drive units 40,42 they are again cabled to the internal circuitry within the housing 12.

Figure 5B:
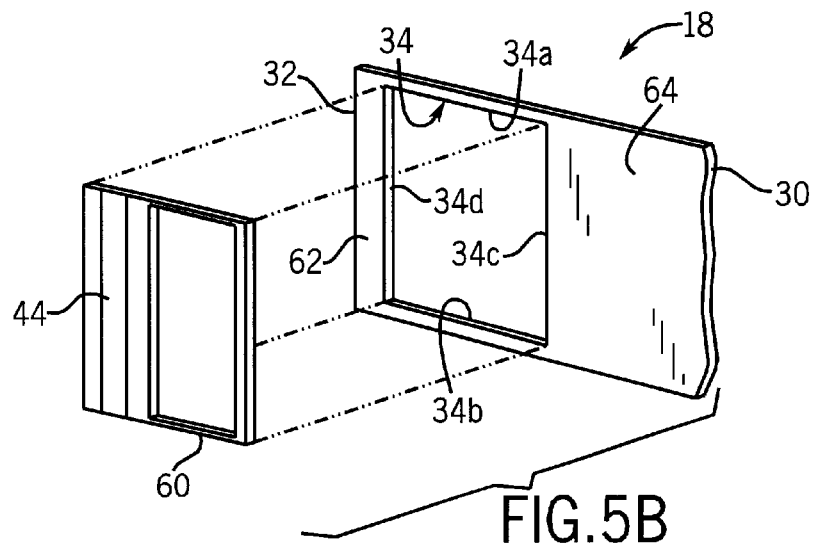

Next, in the removed bezel assembly 18, the frame member 60 is removed from the bezel body well area 62 as shown in FIG. 5A, rotated ninety degrees to its FIG. 5B orientation, and snapped back into place within the well area 62 to position the now reoriented blank-off member 44 so that it is positioned adjacent the end 32 of the bezel body member 30 and longitudinally extends between the opposite sides of the bezel body member opening 30. The bezel assembly 18 is then snapped back into place on the outer side of the fromt housing wall 16, and the now reconfigured computer 10 is tilted upwardly to its FIG. 1B tower configuration and the housing end wall 22 is rested upon the support surface 46.

In this tower configuration of the computer 10, the drive units 40,42 are horizontally positioned relative to the user of the computer, and the blank-off member 44 covers the area of the underlying portion of the housing 36 which is unblocked by the drive units 40,42. If it is later desired to convert the computer back to its FIG. 1A desktop configuration the process is simply repeated by (1) removing and reconfiguring the bezel assembly 18, (2) removing, reorienting and reinstalling the drive units 40 and 42, and (3) replacing the reconfigured bezel assembly 18.

As can be readily seen from the foregoing, this reconfiguration of the computer 10 between desktop and tower orientations thereof may be easily and quickly carried out by the user of the computer using the same housing and without the necessity of using any special tools or reconfiguring the drive support structure within the computer.

The foregoing detailed description is to be clearly understood as being given by way of illustration and example only, the spirit and scope of the present invention being limited solely by the appended claims.

What is claimed is:

1. An electronic apparatus comprising:
   a housing having an exterior wall with an opening therein, said opening having first and second pairs of opposing sides;
   a first opposing pair of support structures extending from said first pair of opposing sides into the interior of said housing and being operative to slidably and supportingly engage opposite portions of each of a plurality of data storage devices insertable into said opening in a first orientation; and a second opposing pair of support structures extending from said second pair of opposing sides into the interior of said housing and being operative to slidingly and supportingly engage opposite portions of each of the plurality of data storage devices insertable into said opening in a second orientation transverse to said first orientation.

2. The electronic apparatus of claim 1 wherein said housing is a computer housing.

3. The electronic apparatus of claim 1 wherein said opening has a square configuration.

4. The electronic apparatus of claim 3 wherein each of said support structures defines a slot longitudinally extending from said opening inwardly into the interior of said housing.

5. For use in conjunction with a computer housing having an exterior wall with an opening therein, a bezel assembly comprising:

a bezel plate member having an opening therein, said bezel plate member being removably securable to the outer side of said exterior housing wall with said bezel plate member opening outwardly overlying said exterior housing wall opening;

a blank-off member having an area less than that of said bezel plate member opening; and means for removably securing said blank-off member to said bezel plate member in a manner causing said blank-off member to block selectively variable portions of said bezel plate member opening adjacent to a modular device wherein, the modular device is insertable into a portion of the exterior housing wall opening at either a first or a second position relative to the computer housing, the first and the second positions being generally perpendicular to one another and, wherein the blank-off member is configured to block-off a first or a second portion of the bezel plate member opening according to the variably selected first or second position of the modular device, respectively.

6. An electronic device, comprising:

a housing;

a support structure operable to selectively support a modular device in one of a first orientation relative to the support structure and a second orientation relative to the support structure, wherein the second orientation is transverse to the first orientation;

a bezel member securable to the housing, the bezel member having an opening therethrough, wherein the modular device is disposed within a first portion of the opening when supported in the first orientation and disposed within a second portion of the opening when supported in the second orientation; and a blank-off member, wherein the blank-off member is securable to the housing in a third orientation to block a third portion of the opening adjacent to the modular device when the modular device is supported in the first orientation, further wherein the blankoff member is securable to the housing in a fourth orientation to block a fourth portion of the opening adjacent to the modular device when the modular device is supported in the second orientation.

7. The device as recited in claim 6, wherein the modular device is a data storage device.

8. The device as recited in claim 7, wherein the data storage device comprises a plurality of first members and the support structure comprises a plurality of second members configured to support the plurality of first members in both the first and second orientations.

9. The device as recited in claim 8, wherein a first member comprises a screw having a head and the second member comprises a slotted guide portion configured to slidingly engage the head of the screw.

10. The device as recited in claim 9, wherein the support structure comprises a plurality of pairs of opposing slotted guides, further wherein a first pair is disposed to support the data storage device in a vertical orientation and a second pair is disposed to support the data storage device in a horizontal orientation.

11. The device as recited in claim 8, wherein the support structures further comprise a securing member to secure the data storage device to the housing.

12. The device as recited in claim 6, wherein the bezel member comprises a plurality of first securing members and the housing comprises a plurality of second securing members configured for mating engagement with the first securing members.

13. The device as recited in claim 6, wherein the blank-off member is attached to the bezel member.

14. A bezel assembly for an electronic device housing, comprising:

a bezel member securable to the housing, the bezel member having an opening therethrough to enable a modular electronic device to pass through the bezel member, wherein the modular electronic device is securable to the housing in first and second orientations relative to the housing, the second orientation being transverse to the first orientation; and a blank-off member selectively securable in a plurality of orientations to block the opening adjacent to the modular electronic device when the modular electronic device is secured to the housing in either the first or the second orientation.

15. The assembly as recited in claim 14, wherein the bezel member is secured to the housing by snapping the bezel member onto the housing.

16. The assembly as recited in claim 14, wherein the blank-off member is selectively securable to the bezel member.

17. The assembly as recited in claim 14, wherein the blank-off member comprises a blank-off portion and a hole therethrough, the hole being configured to overlay the modular electronic device and the blank-off portion configured to occupy the portion of the opening not overlaying the modular electronic device.

18. A computer system selectively configurable for operation in a vertical and a horizontal orientation, comprising:

at least one data storage device; and a housing configured to separately receive a plurality of data storage devices in both a vertical and a horizontal orientation relative to the housing.

19. The system as recited in claim 18, wherein the at least one data storage device comprises a pair of opposite side portions having a plurality of projections therefrom, further wherein the housing comprises a plurality of first and second slot pairs configured to slidingly receive the plurality of projections, each first slot pair being disposed in the housing to receive a data storage device in a vertical orientation and each second slot pair being disposed in the housing to receive a data storage device in a horizontal orientation.

20. The system as recited in claim 18, further comprising:

a bezel member securable to the housing, the bezel member having an opening therethrough to enable a data storage device to pass through the bezel member, wherein the data storage device is securable to the housing in first and second orientations relative to the housing, the second orientation being transverse to the first orientation; and a blank-off member selectively securable in a plurality of orientations to block the opening adjacent to the data storage device when the modular electronic device is secured to the housing in either the first or the second orientation.

21. The system as recited in claim 18, further comprising a securing system operable to independently secure each data storage device to the housing.

22. A method for assembling a computer system that is operable to secure a plurality of data storage devices in a computer housing in a plurality of orientations relative to the computer housing, the method comprising:

selecting an orientation for operation of the computer system; and separately installing a plurality of data storage devices in the computer housing in one of the plurality of orientations so that each of the plurality of data storage devices are secured to the computer housing in a desired orientation for the selected orientation for operation of the computer system.

23. The method as recited in claim 22, further comprising:

securing a bezel assembly to the computer housing, the bezel assembly having an opening adapted to overlay the plurality of data storage devices in each of the plurality of orientations; and securing a blank-off member to the computer housing according to the orientation of the plurality of data storage devices, the blank-off member being selectively securable in a first and second orientation relative to the computer housing to block a portion of the opening, the portion comprising substantially all of the opening not overlaying the plurality of data storage devices.

24. The method as recited in claim 23, wherein changing the selected orientation for operation of the computer system, comprises:

removing the blank-off member and the plurality of data storage devices installed in the housing;

rotating the housing to a new selected orientation for operation of the computer system; and separately reinstalling the plurality of data storage devices in the computer housing for the new selected orientation for operation of the computer system; and securing the blank-off member to the computer housing according to the orientation of the plurality of data storage devices.

25. The method as recited in claim 22, wherein securing the blank-off member comprises attaching the blank-off member to the bezel member.

26. A method for assembling a bezel assembly to a computer system that is selectively configurable for operation in a vertical and a horizontal orientation, the method comprising:

selecting the vertical or horizontal orientation for operation of the computer system;

securing a bezel assembly to the computer housing, the bezel assembly having an opening adapted to overlay a data storage device securable to the computer housing in a first and a second orientation relative to the computer housing; and securing a selectively securable blank-off member to the computer housing according to the orientation of the data storage device to block a portion of the opening not overlaying the data storage device, the blank-off member being securable in a first position when the data storage device is secured to the computer housing in the first orientation and the blank-off member being securable in a second position when the data storage device is secured to the computer housing in the second orientation.

27. The method as recited in claim 26, wherein changing the selected orientation for operation of the computer system, comprises:

removing the blank-off member and data storage device installed in the housing;

rotating the housing to a new selected orientation for operation of the computer system; and reinstalling the blank-off member and the data storage device in the housing for the new selected orientation for operation of the computer system.

28. The method as recited in claim 26, wherein securing the blank-off member to the computer housing comprises attaching the blank to the bezel member.

* * * * *

UNITED STATES PATENT AND TRADEMARK OFFICE
CERTIFICATE OF CORRECTION

PATENT NO. : 6,362,955 B2  
DATED : March 26, 2002  
INVENTOR(S) : Francis A. Felcman et al.

It is certified that error appears in the above-identified patent and that said Letters Patent is hereby corrected as shown below:

<u>Column 7,</u>  
Line 32, please add a comma after the first occurrence of the word "device" and delete the comma after the word "wherein".  
Line 36, please add a comma after the word "another" and delete the comma after the word "and".

Signed and Sealed this

Fourth Day of June, 2002

*Attest:*

*Attesting Officer*

JAMES E. ROGAN  
*Director of the United States Patent and Trademark Office*